(12) United States Patent
Dabiran

(10) Patent No.: US 11,747,493 B2
(45) Date of Patent: Sep. 5, 2023

(54) MULTI-PURPOSE HIGH-ENERGY PARTICLE SENSOR ARRAY AND METHOD OF MAKING THE SAME FOR HIGH-RESOLUTION IMAGING

(71) Applicant: Amir Massoud Dabiran, Chanhassen, MN (US)

(72) Inventor: Amir Massoud Dabiran, Chanhassen, MN (US)

(*) Notice: Subject to any disclaimer, the term of this patent is extended or adjusted under 35 U.S.C. 154(b) by 0 days.

(21) Appl. No.: 17/475,565

(22) Filed: Sep. 15, 2021

(65) Prior Publication Data

US 2022/0082713 A1 Mar. 17, 2022

Related U.S. Application Data

(60) Provisional application No. 63/079,336, filed on Sep. 16, 2020.

(51) Int. Cl.
*G01T 1/208* (2006.01)

(52) U.S. Cl.
CPC .................. *G01T 1/208* (2013.01)

(58) Field of Classification Search
CPC ..... G01T 1/208; G01T 1/1645; G01T 1/2002; G01T 1/20183
See application file for complete search history.

(56) References Cited

U.S. PATENT DOCUMENTS

| | | |
|---|---|---|
| 4,002,938 A | 1/1977 | Pehe |
| 4,069,421 A * | 1/1978 | Bourdel ............. G01T 1/1645 250/390.1 |
| 4,208,577 A | 6/1980 | Wang |
| 4,287,230 A | 9/1981 | Galves et al. |
| 4,398,118 A | 8/1983 | Galves et al. |
| 4,498,225 A * | 2/1985 | Gutierrez ............. H01J 1/34 257/11 |
| 4,730,107 A | 3/1988 | Enck et al. |
| 4,778,565 A | 10/1988 | Enck et al. |
| 4,855,589 A | 8/1989 | Enck et al. |
| 4,893,020 A | 1/1990 | Ono |
| 4,929,835 A | 5/1990 | Yamashita et al. |
| 4,935,617 A | 6/1990 | Anno et al. |

(Continued)

FOREIGN PATENT DOCUMENTS

| | | |
|---|---|---|
| CN | 110416056 A | 11/2019 |
| KR | 20170067452 A * | 6/2017 |

OTHER PUBLICATIONS

"International Search Report and Written Opinion Received dated Dec. 20, 2021", for PCT Application No. PCT/US21/50523, 15 pages.

(Continued)

*Primary Examiner* — Kiho Kim

(57) ABSTRACT

A high-resolution imaging apparatus that includes a multi-purpose high-energy particle sensor array to initially stop high-energy particles and then transfer the down-converted photons into near zero energy photoelectrons is described, as well as the method to produce the same. The imaging apparatus is a segmented scintillator structure optically coupled to a closely placed photocathode structure for high-efficiency conversion of high-energy particles with an arbitrary spatial distribution to the corresponding distribution of photoelectrons, emitted with a very low spread in energy and momentum.

16 Claims, 2 Drawing Sheets

(56) References Cited

U.S. PATENT DOCUMENTS

| | | | |
|---|---|---|---|
| 4,982,136 | A | 1/1991 | Dolizy et al. |
| 5,179,284 | A * | 1/1993 | Kingsley ............... B29C 51/16 |
| | | | 257/E31.118 |
| 5,319,189 | A | 6/1994 | Beauvais et al. |
| 5,515,411 | A | 5/1996 | Tonami et al. |
| 5,587,621 | A | 12/1996 | Colditz |
| 7,039,157 | B2 | 5/2006 | Fujii et al. |
| 7,455,565 | B2 | 11/2008 | Machuca et al. |
| 9,316,742 | B2 | 4/2016 | Chen |
| 2004/0232343 | A1* | 11/2004 | Schmand ............. G01T 1/2002 |
| | | | 250/368 |
| 2008/0272280 | A1 | 11/2008 | Pinkas et al. |

OTHER PUBLICATIONS

Chen, Gongxiaohui, et al., "Mean Transverse 12, 13 Energy of Ultrananocrystalline Diamond Photocathode", Dec. 2, 2018.

Chen, C., et al., "Fabrication of Nanoscale Cesium Iodide (CsI) Scintillators for High-Energy Radiation Detection", Rev. Nanosci. Nanotechnol. 4 (2015) 26.

Watts, R.N., et al., "A transmission x-ray microscope based on secondary-electron imaging", Rev. Sci. Instrum. 68 (1997) 3464.

\* cited by examiner

MULTI-PURPOSE HIGH-ENERGY PARTICLE SENSOR ARRAY AND METHOD OF MAKING THE SAME FOR HIGH-RESOLUTION IMAGING

TECHNICAL FIELD

The present invention is in the technical field of high-energy photon and particle detection and imaging. More particularly, the present invention is in the technical field of high-energy photon and particle detection and imaging equipment. More specifically, the current invention can be used in combination with an electron multiplier and/or electron optics to set up a high-resolution imager or high-power microscope, such as a gamma-ray camera or a x-ray microscope.

BACKGROUND

Conversion of photons to photoelectrons using a photocathode has a number of advantages compared to direct imaging of photons, including convenient signal amplification using an electron multiplier, potential for using electron optics for high-resolution image magnification, and relatively simple conversion back to visible photons for observation and/or recording of the image using different electron detection techniques.

The traditional use of sensitive photographic films for imaging high-energy photons, such as x-ray or extreme ultra-violet (EUV), has been mostly replaced by digital and real-time imaging techniques using a scintillator layer to convert the high-energy photons or particles to lower-energy photons, e.g., visible photons, which can be subsequently recorded using an ordinary camera. The major problem with this method is relatively limited resolving power and magnification capabilities, which becomes very important for some applications, such as high-resolution x-ray microscopy. This problem mainly arises from 1) limitations in the availability of high-performance optics for high-energy photons, e.g., hard x-ray, and 2) a significant image blurring mostly caused by random direction of lower-energy (e.g., visible) photons generated in the thick scintillator layer. The latter problem may be greatly reduced by using thinner scintillator layers but that would also degrade the efficiency of the photon conversion process. Additionally, the attainable depth of field in light optics is quite short for high resolving-power (large numerical aperture) systems, typically in the range of 1 micrometer to 15 micrometers, further reducing the scintillator thickness and trading off signal generation. Whereas this problem is removed for electromagnetic lensing where depths of field are typically 1 millimeter to 10's of millimeters.

SUMMARY OF THE INVENTION

The present invention, a multi-purpose device, for example but not limited to, an integrated photocathode and scintillator for high-resolution imaging with high-energy particles, and method of making the same, herein also referred to as "the invention", addresses the problem with both the limitations of practiced methods for high image magnification using high-energy photons, and the blurring effect of thick scintillator layers used in high-energy photon and particle imaging. This is accomplished by integrating suitable photocathode and scintillator layers with optimized properties and structure for high-efficiency conversion of high-energy photons to photoelectrons with very low spread in energy and momentum in order to allow high-sensitivity photon detection and high-resolution image magnification. The purpose of the first layer is to have high stopping power for high-energy particles, and the purpose of the second layer is to transfer the absorbed energy into low-energy photoelectrons for subsequent emission and electron-optical guiding.

A number of photocathode materials, in particular thin metal-halide films, such as CsI or CsBr, and others, have been previously shown to be suitable for operation in EUV and soft x-ray (1 to 10 keV) range, and they have been used for imaging applications such as transmission soft x-ray microscopy, where a transmission-mode (also called semi-transparent) photocathode is coupled to an electron microscope column for image magnification. However, the photoemission efficiencies of these thin photocathodes are greatly diminished at very high photon energies, such as hard x-ray (10 to 100 keV), due to lower photon absorption. Thicker photocathode films can be used to increase the photon absorption, but a low escape depth in the utilized positive electron affinity (PEA) photocathodes greatly reduces the contribution from photoelectrons generated farther away from the surface, while also more inelastic scattering in thicker photocathode films greatly diminishes the phase coherence of photoelectrons, resulting in further image blurring and reduction in the resolving power of the microscope. Furthermore, as the photon energy is increased, higher energy photoelectrons, i.e., hot electrons, with larger energy and momentum spread are emitted, requiring precise energy filtering in the electron optics column before image magnification, which can severely reduce the beam intensity.

As noted above, various scintillators have been used in x-ray imaging. Separately, direct conversion of soft x-rays to photoelectrons in some photocathodes has been studied for x-ray microscopy, with both techniques having significant problems for high-resolution imaging and microscopy, especially at higher photon energies. The present invention achieves the beneficial aspects of both techniques by integrating high-efficiency thin photocathodes with optimally structured scintillators to provide high photoemission efficiency values of ~1% to near 100%, depending on the excitation wavelength, while delivering coherent photoelectrons with narrow energy spreads <50 meV down to ~1 meV, in order to avoid any significant blurring in the subsequent electromagnetic lensing system or electron-optical column, which is required for high image magnification using high-energy photons or particles. In addition to high-resolution x-ray microscopy, the present invention can greatly impact the performance of EUV and x-ray telescopes, parallel beam electron lithography, and other imaging and electron source applications.

BRIEF DESCRIPTION OF THE DRAWINGS

The present invention may be embodied in a number of relevant components, structures and/or process steps, as well as their arrangement and/or quantities. The drawings are only for the purposes of illustrating a preferred embodiment and are not to be construed as limiting the invention.

DISCLOSURE OF THE INVENTION

Figure 1:
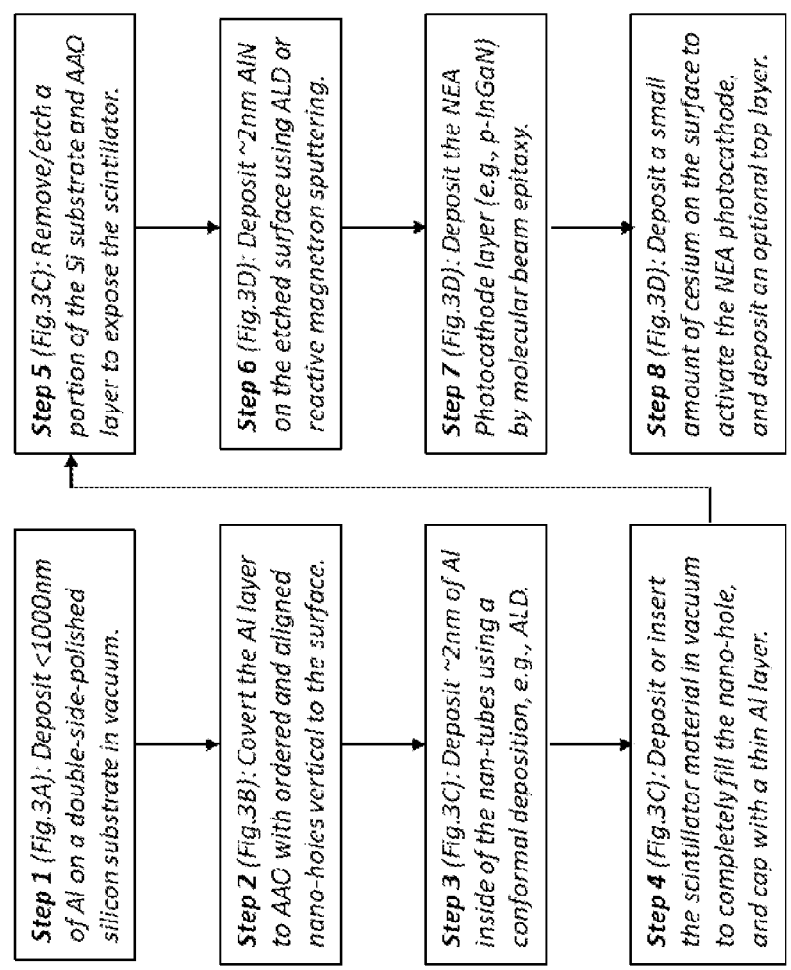
FIG. 1 shows the basic structure and operation of the present invention including a photocathode layer integrated with a wavelength-matched scintillator structure for efficient conversion of high-energy photons and particles to photoelectrons, which are emitted into vacuum with a narrow energy and momentum spread for achieving very high-resolution imaging in conjunction with an intensifier and/or electron optics.

To describe the present invention in more details, a cross sectional view of an embodiment of the apparatus 15, comprised of an integrated scintillator structure 25 and a photocathode structure 35, is schematically shown in FIG. 1. In this embodiment a thin transmission-mode (also called semi-transparent) negative electron affinity (NEA) photocathode 18, which can be comprised of single-crystalline, poly-crystalline and/or amorphous forms of materials such as GaAs, GaAsP, GaN, or alloys of these materials with other elements, for example InAlGaN, with mole fraction of different constituents ranging from 0% to 100%, and/or with different levels of doping materials, and/or combinations of these materials with different arrangements and/or materials composition and/or composition gradients, etc., in order to adjust different properties of the photocathode layer 18, such as energy bandgap, optical absorption, electrical conductivity, photoelectron emission, defect levels, surface morphology, etc., as well as another types of photocathode materials and structures, is integrated with a thin (e.g., less than 10 μm) and optimally structured scintillator layer 25 with a properly matching luminescence spectrum. Some examples of the scintillator materials include cesium-iodide (CsI), thallium-doped sodium-iodide (NaI:Tl), cerium-activated yttrium aluminum garnet (YAG:Ce), cerium-tribromide (CeBr$_3$), as well as other types, combinations, or arrangements of inorganic and/or organic scintillators.

In an embodiment of the present invention the photocathode structure 35 and scintillator structure 25 may be integrated by direct deposition of the photocathode layer 18 on the scintillator structure 35, or vice versa, with or without an intermediate layer 24, using any appropriate thin-film deposition or growth process, such as liquid phase epitaxy, vapor phase epitaxy, physical vapor deposition, chemical vapor deposition, atomic layer deposition, spray or spin coating, or others.

In another embodiment of the present invention the photocathode structure 35 and scintillator structure 25 may be integrated by physical attachment, including simple stacking or positioning of the photocathode structure 35 and scintillator structure 25 with or without an intermediate layer 24.

In another embodiment of the present invention the photocathode structure 35 and scintillator structure 25 may be integrated by chemical bonding, using an appropriate adhesive and/or by thermal and/or pressure bonding, or other wafer bonding methods in vacuum or under an appropriate atmosphere or in another medium, with or without an intermediate layer 24.

In a further embodiment of the present invention the scintillator material 14 may consist of single-crystalline, polycrystalline, and/or amorphous, micro-structure and/or nano-structured layers, consisting of one or more material compositions or composition gradients, and/or different doping or activation materials or impurities, with different doping level profiles. Furthermore, the structure and segmentation of the scintillator material 14 may be naturally formed in the deposition, annealing, or bonding process, or intentionally formed and/or patterned for the purpose of improving the luminescence spectrum, photon yield, and/or other characteristics, and/or for improving the integration of the photocathode structure 35, and/or reducing the image blurring and/or increasing the efficiency by confining and/or directing the generated photons using internal reflection and/or a surface reflection layer, and/or forming a waveguide. Furthermore, other techniques and effects, such as stimulated luminescence, photonic band-gap materials and structures, plasmonic structures and effects, and/or other techniques may be used to enhance the photon confinement and/or directionality in order to increase photon density in the scintillator 14 and/or reduce the image blurring.

In a further embodiment of the present invention, the photocathode structure 35 may include single-crystalline, and poly-crystalline, and/or micro-structure and/or nano-structured layers, and/or hetero-structures, comprising one or more material compositions or composition gradients, including different combinations of various NEA and PEA photoemissive materials and structures, and/or different doping or activation materials or impurities with different doping level profiles, and/or a deposited or formed NEA activation layer 28, or layers, and/or a protective top layer 30, or layers, such as an electron-transparent graphene film or a grid structure, for the purpose of increasing photoemission efficiency, and/or reducing the momentum spread of the emitted electrons, and/or modifying the surface conductivity, and/or improving the stability, and/or increasing lifetime, and/or enhancing robustness of the device, and/or reducing the production costs, and/or other beneficial characteristics.

The device operation is initiated by energetic radiation 12 (e.g., an x-ray photon or a beta particle) entering into the scintillating material 14 to generate a number of lower energy photons 16 (e.g., visible photons) which then cross into the photocathode layer 18 to produce photoelectrons 20, which diffuse and/or drift to the surface, and under proper NEA conditions at the surface are ejected into vacuum 22. The emitted photoelectrons 20 can be then detected, or their number can be first increased using an electron multiplication method (e.g., a microchannel pate) for signal amplification, and/or further manipulated using electron optics for image magnification, electron beam lithography, or other applications.

DETAILED DESCRIPTION OF THE PREFERRED EMBODIMENTS

FIG. 1 shows the structure of an imaging apparatus, according to one example embodiment. An imaging apparatus or device 15 includes an anodized aluminum oxide (AAO) layer 10 that includes high-aspect-ratio microscopic open pores, herein referred to as nano-tubes, therein to form the segmented scintillator structure 25. In one embodiment, AAO nano-tubes are formed in an aluminum layer. The sidewalls of the nano-tubes are coated with a reflective material 26, and the nano-tubes are filled with scintillator materials 14. A photocathode structure 35 is positioned in close proximity and is optically coupled to the segmented scintillator structure 25. In one embodiment, the segmented scintillator structure 25 is uniformly segmented. In another embodiment, the segmented scintillator structure 25 is intentionally patterned. The segmented scintillator structure 25, in still another embodiment also includes a patterned matrix filled with a scintillator material 14. The scintillator material 14 is inside the patterned matrix. In still another embodiment, the segmented scintillator structure 25 is further comprised of plurality of aligned and ordered nano-tubes, filled with scintillator materials 14. At least some of the filled nano-tube form a waveguide to collimate and orient the photons 16 generated in the scintillator materials 14 toward the photocathode structure 35. The nano-tubes also can include a reflective coating 27 on top of the aligned and ordered nano-tubes.

The photocathode structure 35 includes one or more layers of high-efficiency semiconductor negative electron affinity (NEA) photocathode materials 18. In one embodiment, one or more layers of high-efficiency NEA photocathode materials 18 are employed in a semi-transparent mode, with a main energy bandgap tuned to the emission characteristics of the scintillator material 14 in order to minimize mean transverse energy (MTE) by reducing the energy and density of hot photoelectrons.

FIG. 1 also illustrates the basic operation of the invention, as well as the design and constituents of a preferred embodiment of the invention. It should be noted that the present invention is meant to be applicable for different incident high-energy radiation, including EUV, x-rays both hard and soft, gamma-rays, beta particle, alpha particles, energetic neutrons, and other ionizing radiation and particles. However, some details regarding the materials and structures used in the preferred embodiment of the invention will depend on the type of radiation to be detected. The characteristic of the incident radiation also determines the quantitative details of the preferred embodiment of the invention, such as different dimensions and arrangement of individual parts, as well as the type of scintillator and photocathode materials and of other components shown in FIG. 1. Hence, as an elucidating example of the preferred embodiments, the case of soft x-rays photons (1 to 10 KeV), with application of the invention in transmission x-ray microscopy, is described in details.

As shown in FIG. 1, x-ray radiation 12 enters the device 15 at near normal incidence. For example, the x-rays could be from a well-collimated and monochromatic x-ray source, after passing through a specimen positioned right above the device 15, and collectively forming a shadow image of the specimen for transmission x-ray microscopy, or from a distant x-ray source, such as a galactic center, collectively focused as an image on the device 15 using x-ray optics.

In the construction of the device 15, discussed in the following sections, the scintillator nano-columns are inserted or deposited in the well-oriented and uniformly sized and spaced nano-tubes that are formed in isotropic anodized aluminum oxide 10 (AAO). Depending on the details of the isotropic AAO fabrication process, the nano-tubes with a hexagonal or near circular cross section and a two-dimensional closed-packed surface arrangement are formed in an aluminum film. The nano-tubes can be as long as few hundred micrometers, can have pore diameter and wall thickness as small as few nanometers to several hundred nanometers, with a pore dimeter of 5 nanometer to 50 nanometer being the most useful range, as well as a straight or tapered profile, all of which can be adjusted depending on the desired characteristics of the device 15. Though the most useful orientation of the nano-tubes is at normal to the plane of the photocathode layer, as illustrated in FIG. 1, a tilt angle of nano-tubes assembly 25 which is possible to create with some additional processing steps, may be useful for some applications, for example to prevent unabsorbed portion of incident x-rays from entering an attached electron-optics column, or for personal and equipment safety considerations. Prior to the insertion or deposition of the scintillator material 14 inside the nano-tubes, a very thin layer 26 of a material which is transparent to x-rays but very reflective for UV and/or visible light, such as 1 nm to 10 nm (~nm is preferred) film of high-purity aluminum, is deposited on the walls of the nano-tubes using a conformal thin-film deposition technique. A similar highly-reflective thin-film 27 is also deposited on top of the AAO surface, after filling the nano-tubes with the scintillator material 14. As shown in FIG. 1, an x-ray photon entering a scintillator nano-column 14 can produce a number of lower energy photons 16, depending on the x-ray photon energy and scintillator materials used, by interacting with the scintillator materials, such as $CeBr_3$, which has a photon yield of ~60 photons/keV emitted at a peak wavelength of ~380 nm. Most of the emitted photons 16, which are randomly oriented, are guided out of the scintillator column 14 into the photocathode layer 18, after multiple reflections from the reflective coating inside 26 and on top 27 of the nano-tubes.

The photocathode 18, in one of its simplest forms, can be a thin (~5 nanometer to 1000 nanometer, preferably ~50 nanometer) layer of p-doped indium-gallium-nitride (p-InGaN), with an indium mole fraction of up to 50% for a practical p-doped InGaN NEA photocathode, which is epitaxially deposited directly on the exit side of the AAO substrate, after depositing a thin optically-transparent nucleation/buffer layer 24. Incorporation of indium in GaN reduces the energy bandgap depending on the indium mole fraction, whereas alloying with aluminum (e.g., AlGaN) can be used to increase the energy bandgap. For example, in order to tune the energy bandgap of p-InGaN for the peak emission of the $CeBr_3$ scintillator at ~380 nm, the indium mole fraction should be about 5%, based on published experimental results on InGaN bandgap versus indium mole fraction. Tuning the energy bandgap of the NEA photocathode, particularly when the excitation photon energy is fixed, can be very important for reducing the mean transverse energy (MTE) of the emitted photoelectrons, which in turn is important for improving the imaging resolution of the microscope or detection system employing the present invention. Other approaches to reducing MTE include cooling the photocathode to cryogenic temperatures in order to reduce thermal emission, and/or reducing the surface roughness of the photocathode layer to improve surface electric field uniformity, and/or using photocathode structures that enhance thermalization of hot electrons (i.e., photoelectrons that are excited to energies significantly above the conduction band minimum), and/or inserting energy-filtering layers in the photocathode structure to reduce the energy spread of the emitted photoelectrons. It should be noted that the materials and structure of the present invention is compatible with applying all of the above techniques to minimize MTE. However, employing any of these additional features depends on both the photocathode characteristics and the details of the application, and hence, they are not included in the basic preferred embodiment of the present invention, as illustrated in FIG. 1. The more common additional component of the photocathode, shown in FIG. 1, is the NEA activation layer 28, which is usually a very thin cesium layer for p-GaN-based NEA photocathodes. FIG. 1 also shows an optional electron-transparent film 30, such as a graphene layer, to provide additional protection against surface oxidation, and/or rapid loss of Cs layer, and/or surface damage due to ion back-bombardment, and/or enhance the uniformity of surface electric field for improved photoemission uniformity.

Figure 2:
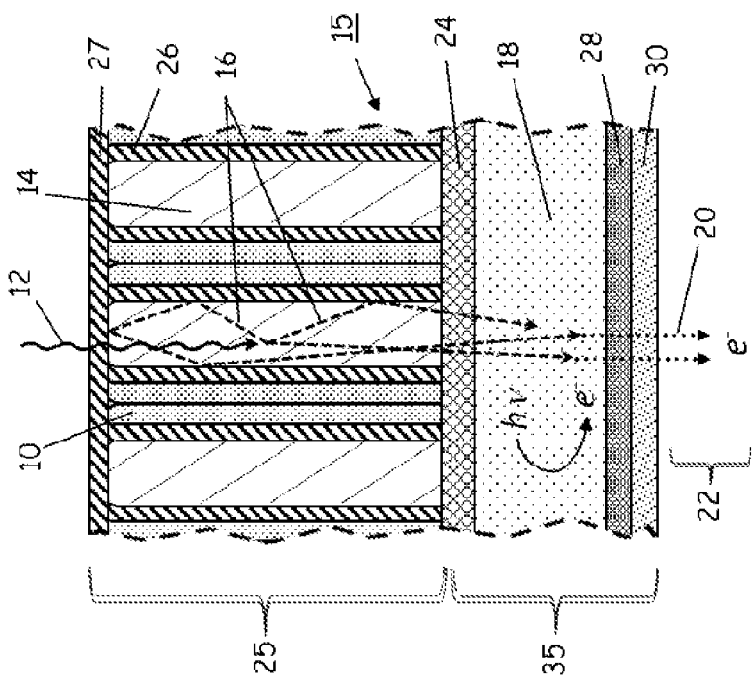
FIG. 2 is a flow diagram of the main steps in the inventive method for fabricating the preferred embodiment of the present invention.
Figure 3A:
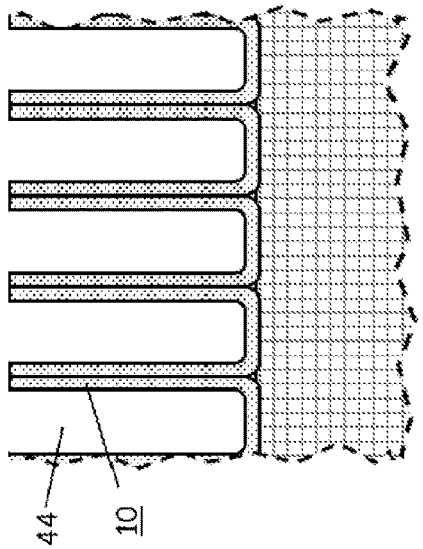
FIGS. 3A, 3B, 3C, and 3D illustrate sequential steps in a preferred process for fabrication of a preferred embodiment of the invention, while a number of useful variations of each basic process step, not shown in these figures, are discussed in the detailed description of the invention.
Figure 3B:
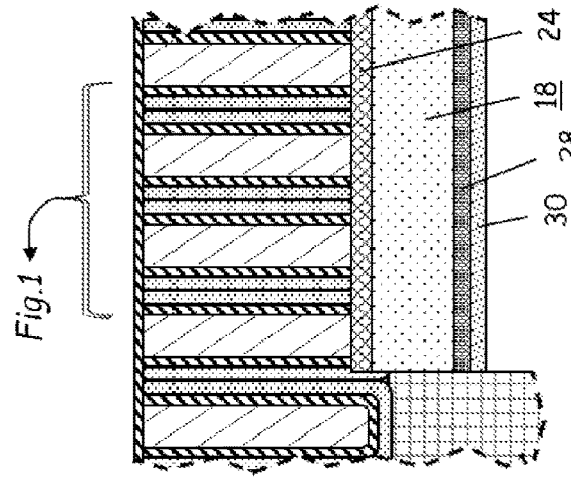

FIG. 2 is a flow diagram of the main steps of the inventive method for fabricating the preferred embodiment of the present invention. Each step in FIG. 2 refers to one of the FIGS. 3.A, 3.B, 3.C, and 3.D, illustrating the consecutive stages of the fabrication process. It should be noted that the materials and processes to be described are not to be constructed as limiting the invention, but an example of preferred materials and methods for constructing the preferred embodiment of the invention, as illustrated in FIG. 1. The fabrication process is started by depositing a thin layer of high-purity aluminum 42 on a standard conductive double-side polished silicon (111) or (100) substrate 40, as shown in FIG. 3A. The thickness of the aluminum layer 42 depends on the desired length of the AAO nano-tubes (<100 nanometer). Standard recipes for silicon surface preparation, and vacuum deposition of high-quality epitaxial aluminum films are used in order to improve the quality of the AAO structure 10, shown in FIG. 3B. The anodization of the aluminum layer 42 is also done using published recipes to control the characteristics of the highly ordered nano-tubes 44, including pore diameter, spacing, uniformity, and if needed any tapering or tilting of the nano-tube walls. The aluminum layer can be anodized either completely, as shown in FIG. 3B, or partially by not converting a portion of the aluminum layer into AAO. Next, a thin layer (~1 nanometer) of reflective aluminum is deposited inside the nano-tubes 44 using a conformal thin-film deposition technique, preferably atomic layer deposition (ALD), using a standard thin-film deposition recipe.

Figure 3C:
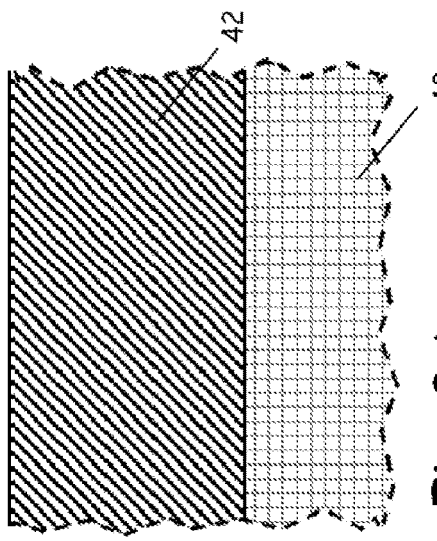
Figure 3D:
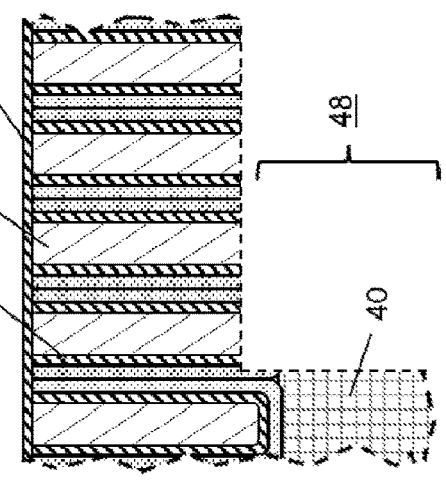

The next step which is filling the nano-tubes 44 with the scintillator material 14, depends on the AAO nano-tube dimensions and the scintillator material. For example, the melting temperatures of CsI, NaI, and CeBr$_3$ scintillators are between ~630° C. to 730° C., which allow a hydraulic hot-press melt insertion process in vacuum. After filling the nano-tubes 44 with the scintillator material 14, a thin (1 nanometer to 10 nanometer) reflective aluminum film 27 is also deposited on the top using ALD or other thin-film deposition techniques. The resulting structure is illustrated in FIG. 3C after the removal of a portion of both the silicon substrate 40 and the scintillator-filled structure 25, to form an access hole 48 from the backside of the substrate. The access hole 48 provides an exit for the photons that are generated in the scintillator 14, and allow a direct deposition and/or attachment of the photocathode structure 35 at the exit surface. The process of forming the access hole 48 can be performed by a combination of mechanical and/or wet chemical etching and/or anisotropic dry chemical etching, such as reactive ion etching (RIE), using established semiconductor processing recipes The fabrication of the preferred embodiment of the present invention is completed by forming the photocathode structure 35 in the access hole 48, as illustrated in FIG. 3D. The photocathode layer 18 may be deposited directly on the etched face of the scintillator structure 25, by a number of deposition techniques, such as molecular mean epitaxy (MBE). However, the preferred process, illustrated in FIG. 3D, starts by forming a thin, optically transparent nucleation/buffer layer 24. This layer can be for example a very thin (1 to 100 atomic monolayer) aluminum-nitride (AlN) film deposited by RF-plasma-assisted MBE, or reactive magnetron sputtering or plasma-enhanced ALD. These thin-film deposition techniques allow formation of smooth c-place oriented AlN at moderate temperatures of <400° C., which is important to prevent melting of the scintillator materials and/or any significant interface reaction between the scintillator and buffer layer. Next, the photocathode layer 18, which is ~50 nanometer of magnesium-doped InGaN, with indium mole fraction of ~5% for matching the CeBr$_3$ emission, is epitaxially grown on the AlN layer 24 in an RF-plasma-assisted MBE chamber, which in addition to an RF-plasma nitrogen source, is at least equipped with calibrated effusion sources for depositing Ga, In, and magnesium (Mg, for p-doping). Finally, a very thin layer (about 1 monolayer) of cesium 28 is deposited in a separate vacuum chamber on the p-InGaN photocathode layer 18 in order to induce NEA at the surface. An optional electron-transparent top layer 30, such as single-layer graphene, may be also deposited or transferred onto the photocathode structure in order to improve the stability, lifetime, and/or photoemission emission characteristics.

There are a few other important details to consider, including the diameter of the access hole 48 in FIG. 3C, or in other words the size of the resulting scintillator-photocathode membrane, which in the case of transmission x-ray microscopy determines the maximum sample size for imaging. The main factor limiting the size of the membrane for this application is the mechanical tolerance of the completed device structure 15 for the total uniaxial pressure that results from the atmospheric pressure on the x-ray side, with the photocathode side in vacuum 22, plus the electrostatic force from the high acceleration fields of >40 KV in the electron optics column. Assuming that the AAO thickness is about 500 nm, based on the experimentally tested strength of AAO structures, this high uniaxial stress should not be a major problem for a membrane with diameter of less than a few millimeters, which can potentially be even larger when the nano-tubes 44 are filled with the scintillator materials 14. However, the practical size of the membrane should be determined experimentally based on the details of the device structure. It should be also noted that a limited deformation, or bowing, of the membrane under high uniaxial pressures is acceptable since relatively simple x-ray optics can be used to maintain the normal incidence of the incoming x-rays 12 with respect to the bowed plane of the structure 15, while also reversing the resulting small divergence of the emitted photoelectrons 20 can be accomplished using an electron beam condenser. The sample size restriction for transmission x-ray microscopy application may also be solved by using an x-ray transparent sample holder such as ultra-thin CNB membranes from Canatu Oy (Vantaa, Finland) in order to position or mechanically scan larger samples across the imaging area of the device 15. Alternatively, for applications requiring larger size membranes a mechanical support grid can be formed at the same time that the access hole 48 is etched into the substrate, and/or deposited later on top and/or bottom of the device. The openings in the mechanical support grid would allow simultaneous observation of a number of smaller regions of interest in the sample, which can be important for observing interaction and effects of spatially separated parts of a sample, which can be for example a complex micro-electromechanical system (MEMS) device or a multi-cell biological specimen. It should be also noted that for some applications such as x-ray detection/imagining in astronomy, or high-resolution position sensing detectors for high-energy-physics experiments, there is no such size restriction since for these applications normally both sides of the device 15 will be in vacuum, and also usually much lower acceleration electric fields are applied compared to applications that employ electron optics. Furthermore, the size, depth and shape of the access hole 48, including the bottom and sidewall profiles, as well as any built-in or field-induced bowing or otherwise shaping of the membrane, may be utilized for a number of other beneficial aspect of the present invention, such as shaping the electrostatic field at the surface and edges of the membrane for improved photoemission characteristics or focusing the photoelectrons, and/or creating a built-in strain in the membrane to oppose the stress caused by atmospheric and electrostatic forces, and/or other beneficial features to improve the performance, increase the utility, and/or lowering the production costs by simultaneously fabricating many small size membranes on large diameter substrates (e.g., 300 mm silicon substrate), etc.

Hence, the multi-purpose high-energy particle sensor array of the present invention, in its various possible embodiments, provides the flexibility to match the requirements in a number of important applications, while maintaining the main purpose and sprit of enabling previously unmatched imaging resolutions using high-energy particles in a practical device.

In summary, an imaging apparatus includes a segmented scintillator structure, and a photocathode structure optically coupled to the segmented scintillator structure. The imaging apparatus converts high-energy particles with an arbitrary spatial distribution to a corresponding distribution of photoelectrons, emitted with a very low spread in energy and momentum. In one embodiment, the segmented scintillator structure is uniformly segmented. In another embodiment, the segmented scintillator structure is intentionally patterned. The segmented scintillator structure, in still another embodiment also includes a patterned matrix filled with a scintillator material. The scintillator material is inside the patterned matrix. In still another embodiment, the segmented scintillator structure is further comprised of plurality of aligned and ordered nano-tubes, filled with scintillator materials. At least some of the filled nano-tube form a waveguide to collimate and orient the photons generated in the scintillator materials toward the photocathode structure. The nano-tubes also can include a reflective coating on the side walls and top of the aligned and ordered nano-tubes.

The photocathode structure includes one or more layers of high-efficiency semiconductor negative electron affinity (NEA) photocathode materials. In one embodiment, one or more layers of high-efficiency semiconductor NEA photocathode materials are employed in a semi-transparent mode, with a main energy bandgap tuned to the emission characteristics of the scintillator materials in order to minimize mean transverse energy (MTE) by reducing the energy and density of hot photoelectrons.

A method for fabrication an imaging apparatus includes depositing a layer of a first material on a substrate, forming nano-tubes in the first material, depositing a reflective material inside of the nano-tubes, inserting a scintillator material in the nano-tubes, removing a portion of the substrate to expose the nano-tubes filled with scintillator material, and depositing an NEA photocathode material onto the area with exposed nano-tubes filled with scintillator material. In one embodiment, cesium is deposited onto the photocathode layer to activate the NEA photocathode material. In still another embodiment, another layer is deposited onto the activated the NEA photocathode material. The method can also include tuning one or more parameters of the photocathode structure to reduce the mean transverse energy (MTE) of the emitted photoelectrons in order to achieve an image resolution in the range of 1 nm to 50 nm. In another embodiment, tuning one or more parameters of the photocathode layer for reducing the MTE of the emitted photoelectrons includes at least one of:

the composition of the materials of the photocathode layer;

the surface morphology of the photocathode layer;

inserting electron thermalization structures in the photocathode layer;

inserting energy filtering structures in the photocathode layer;

cryogenic cooling of at least a portion of the photocathode layer; and applying electron-transparent surface coatings to the photocathode layer.

Also disclosed is a high-energy particle transfer microscope that comprises an electron optics column coupled to the imaging apparatus of the present invention. Further disclosed is a high-energy particle transfer microscope that also includes an electron charge intensifier in the electron optics column.

Additionally disclosed is a high-energy particle imager that comprises the imaging apparatus of the present invention, coupled to an electron charge intensifier array and a phosphor screen or a position-sensitive electric charge readout array, for high resolution imaging using ionizing radiation, including x-ray or gamma ray photons, or other high-energy particles.

Also disclosed is a position-sensitive high-energy particle detector that comprises the imaging apparatus of the present invention, coupled to an electron charge intensifier and a position-sensitive electric charge readout array, for high-efficiency detection of high-energy particles and photons with high spatial and temporal resolutions.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The present invention should therefore not be limited by the terms, expressions, qualities and quantities, and the drawings, and details therein, used in this document to describe the present invention. Similarly, references to some of the possible embodiments of the present invention and methods of making the same, are not meant to exclude equivalent or other embodiments, or portions thereof, including various modifications, additions and/or substitutions with current or later-developed materials or parts of inferior, equal or better performance, which are all possible to do by those skilled in the art without departing from the scope and spirit of the invention. Thus, having described the preferred embodiment, and method of making the same, the present invention is claimed to be as follows.

I claim:

1. An imaging apparatus comprising:
a segmented scintillator structure; and
a photocathode structure optically coupled to the segmented scintillator structure, for conversion of high-energy particles with an arbitrary spatial distribution to a corresponding distribution of photoelectrons, the photocathode structure comprising one or more layers of high-efficiency semiconductor negative electron affinity (NEA) photocathode materials employed in a semi-transparent mode with a main energy bandgap tuned to the emission characteristics of the scintillator material in order to minimize mean transverse energy (MTE) by reducing the energy and density of hot photoelectrons.

2. The imaging apparatus of claim 1 wherein the segmented scintillator structure is uniformly segmented.

3. The imaging apparatus of claim 1 wherein the segmented scintillator structure is intentionally patterned.

4. The imaging apparatus of claim 1 wherein the segmented scintillator structure is further comprising:
a patterned matrix; and a filling of scintillator material inside the patterned matrix.

5. The imaging apparatus of claim 1 wherein the segmented scintillator structure is further comprised of plurality of aligned and ordered nano-tubes, filled with scintillator materials, each forming a waveguide to collimate and orient the photons generated in the scintillator materials toward the photocathode structure.

6. The imaging apparatus of claim 5 further comprising a reflective coating on the side walls and top of the aligned and ordered nano-tubes.

7. A method for fabrication of the imaging apparatus of claim 1 comprising:
depositing a layer of a first material on a substrate;
forming nano-tubes in the first material;
depositing a reflective material inside of the nano-tubes;
Inserting a scintillator material in the nano-tubes;
removing a portion of the substrate to expose the nano-tubes filled with scintillator material; and
depositing an NEA photocathode material onto the area with exposed nano-tubes filled with scintillator materials.

8. The method for fabrication of the imaging apparatus of claim 7 further comprising:
depositing cesium, onto the NEA photocathode material to activate the NEA photocathode material; and
depositing a layer onto the activated the NEA photocathode material.

9. The method for fabrication of the imaging apparatus of claim 1 further comprising depositing cesium onto the photocathode layer to activate the NEA photocathode material.

10. The method for fabrication of the imaging apparatus of claim 1 further comprising tuning one or more parameters of the photocathode structure to reduce the mean transverse energy (MTE) of the emitted photoelectrons in order to achieve an image resolution in the range of 1 nm to 50 nm.

11. The method for fabrication of the imaging apparatus of claim 1 further comprising tuning one or more parameters of the photocathode layer to reduce the MTE of the emitted photoelectrons includes at least one of:
the composition of the materials of the photocathode layer;
the surface morphology of the photocathode layer;
inserting electron thermalization structures in the photocathode layer;
inserting energy filtering structures in the photocathode layer;
cryogenic cooling of at least a portion of the photocathode layer; and
applying electron-transparent surface coatings to the photocathode layer.

12. A high-resolution high-energy particle imaging device that comprises an electron optics column coupled to the imaging apparatus of claim 1.

13. A high-resolution high-energy particle transfer device that comprises an electron charge intensifier coupled to the imaging apparatus of claim 1.

14. The imaging apparatus of claim 1, coupled to an electron charge intensifier array and a position-sensitive electric charge readout array, for high-efficiency and high-resolution detection of ionizing radiation, including x-ray or gamma ray photons, or other high-energy particles.

15. The imaging apparatus of claim 1, coupled to an electron charge intensifier array and a phosphor screen or a position-sensitive electric charge readout array, for high-efficiency and high-resolution imaging using ionizing radiation, including x-ray or gamma ray photons, or other high-energy particles.

16. An imaging apparatus comprising:
a segmented scintillator structure; and
a photocathode structure optically coupled to the segmented scintillator structure, for conversion of high-energy particles with an arbitrary spatial distribution to a corresponding distribution of photoelectrons, with the photocathode structure comprising one or more layers of high-efficiency semiconductor negative electron affinity (NEA) photocathode materials employed in a semi-transparent mode with a main energy bandgap tuned to the emission characteristics of the scintillator material in order to minimize mean transverse energy (MTE) by reducing the energy and density of hot photoelectrons.

* * * * *